United States Patent [19]

Reed

[11] Patent Number: 4,575,453
[45] Date of Patent: Mar. 11, 1986

[54] MODIFIED CLAUS FURNACE

[75] Inventor: Robert L. Reed, Houston, Tex.

[73] Assignee: Amoco Corporation, Chicago, Ill.

[21] Appl. No.: 670,708

[22] Filed: Nov. 13, 1984

[51] Int. Cl.$^4$ .......................... C01B 17/04; B01J 8/04
[52] U.S. Cl. .................... 422/149; 422/160; 422/172; 422/196; 431/174; 423/574 R
[58] Field of Search ............... 422/149, 160, 169–172, 422/182, 188, 190, 196; 431/161, 174, 236, 237; 423/574 R, 574 G

[56] References Cited

U.S. PATENT DOCUMENTS

| Re. 28,830 | 5/1976 | Hunt, Jr. et al. ............... 423/574 R |
| 2,117,968 | 5/1938 | Lutherer ........................... 431/236 |
| 2,219,917 | 10/1940 | Crosiar ............................. 431/236 |
| 3,476,513 | 11/1969 | Welty, Jr. et al. ................ 422/182 |
| 3,749,762 | 7/1973 | Montgomery ...................... 423/574 |
| 3,758,676 | 9/1973 | Goddin, Jr. et al. .............. 423/573 |
| 3,885,919 | 5/1975 | Pillard .............................. 431/174 |
| 4,035,474 | 7/1977 | Kunkel et al. .................. 423/574 R |
| 4,331,630 | 5/1982 | Pool ................................ 422/160 |
| 4,462,977 | 7/1984 | Reed ............................. 423/574 R |

FOREIGN PATENT DOCUMENTS 1341357 9/1963 France ............................... 431/236

Primary Examiner—David L. Lacey
Attorney, Agent, or Firm—Robert R. Cochran

[57] ABSTRACT

Modified Claus furnace containing, in addition to primary reaction chamber, a secondary chamber in heat exchange with said primary reaction chamber wherein H$_2$S is cracked to supply hydrogen needed downstream in a clean-up system. This eliminates the need for supplemental hydrogen generator now usually provided for in a sulfur recovery system. A catalyst such as cobalt-molybdenum can be used in the secondary reaction chamber.

5 Claims, 3 Drawing Figures

MODIFIED CLAUS FURNACE

FIELD OF THE INVENTION

This invention relates to an improved Claus sulfur recovery furnace containing a provision for the generation of increased amounts of hydrogen therein. In a further aspect, the invention relates to a process of operating a Claus recovery system to provide greater than normal amounts of hydrogen in the output from the Claus thermal (muffle) furnace, thereby eliminating any need for a separate hydrogen generator in subsequent downstream steps of the system.

BACKGROUND OF THE INVENTION

A basic commercial process for recovery of hydrogen sulfide from acid gas streams is the Claus process. The basic chemical reactions occurring in the Claus process are presented in Equations (I), (II), and (III).

$$H_2S + \tfrac{1}{2}O_2 \rightleftharpoons H_2O + S \tag{I}$$

$$H_2S + 3/2 O_2 \rightleftharpoons H_2O + SO_2 \tag{II}$$

$$H_2S \rightleftharpoons H_2 + S \tag{III}$$

$$2H_2S + SO_2 \rightleftharpoons 2H_2O + 3S \tag{IV}$$

Reactions (I), (II), and (III) occur in a thermal zone (reaction furnace) sometimes called a muffle furnace, and reaction (IV) occurs primarily in a catalytic zone (catalytic reactor). The Claus process thus comprises two stages: (1) a thermal stage above, for example, 1850° F., and typically in the range of 2000° F. to 3000° F., and (2) a catalytic stage generally, for example, between a temperature somewhat above the sulfur dewpoint of the gas stream and about 700° F.

In the thermal zone, a gas stream containing hydrogen sulfide can be burned with an oxidant in a reaction furnace to form hot combustion gases containing a substantial amount of free sulfur which can be condensed after cooling the hot combustion gases. This condensation can take place in a first waste heat boiler and subsequently in a sulfur condenser. Thereafter, the lean gas goes to the catalytic reactor system wherein the reaction of Equation (IV) takes place.

Typically, the oxidant is air. However, other oxidants which are suitable include pure oxygen, oxygen enriched air, and sulfur dioxide. The tail gas from this system was, at one time, released to the atmosphere or, more usually, passed to an incinerator. As environmental control requirements have become more strict, work has been done to improve tail gas clean-up. Some of these newer processes reduce all sulfur species to hydrogen sulfide by reduction before further processing. Although it is known that the normal Claus tail gas contains some hydrogen and carbon monoxide produced in the thermal reaction zone, there is a possibility that there will be incomplete hydrogenation at some times in plant operation. For this reason, the practice has been to include a reducing gas generator in these designs. This represents an initial investment plus operating costs.

The system of the present invention eliminates the need for a separate hydrogen generator as a result of a modification of the Claus furnace.

An object of this invention is to provide an improved Claus thermal reaction zone.

A further object of this invention is to provide a method for the operation of the Claus system which eliminates the need for a separate hydrogen generator in the tail gas treating system.

Other objects and advantages of the present invention will be apparent to those skilled in the art upon reading the present disclosure.

SUMMARY OF THE INVENTION

In one aspect, the invention resides in a Claus thermal conversion furnace comprising a primary furnace chamber, a burner in said primary furnace chamber, an oxidant containing gas supply inlet to said burner, a hydrogen sulfide containing gas supply inlet connected to said burner, an outlet extending from said furnace, a secondary reaction chamber in heat but not gas exchange relationship with said primary reaction chamber, said secondary reaction chamber extending through the length of said primary furnace chamber to a point in the outlet extending from said primary furnace chamber, and a hydrogen sulfide containing gas supply conduit connected to each said chamber. The secondary reaction chamber normally is made up of one or more ceramic tubes. Such tubes made of high purity alumina are readily available and capable of operating at temperatures up to 3400° F. Normally, the hydrogen sulfide containing gas supply is common with the main feed to the primary reaction chamber and a bleed stream, having a valve therein, extending to the hydrogen sulfide containing gas supply inlet to the secondary reaction chamber.

Equilibrium can be more readily obtained if the secondary reaction chamber is packed with a cobalt-molybdenum catalyst. One example which is commercially available is Houdry HR-801. Downstream of the thermal furnace is the apparatus (catalytic reactor) known for the recovery of sulfur from said chamber. Downstream of the Claus catalytic reactor system, a tail gas clean-up system is provided.

In another aspect, the invention resides in a Claus sulfur recovery process, wherein a hydrogen sulfide containing gas is reacted with an oxidant containing gas in a thermal conversion zone and the resulting stream contacted in at least one Claus catalytic conversion zone thereby producing free sulfur and a tail gas containing sulfur dioxide, and said tail gas is passed to a hydrogenation zone wherein sulfur dioxide is reduced to hydrogen sulfide, comprising increasing the production of reducing gas or hydrogen in said thermal conversion zone by passing a portion of said hydrogen sulfide feed to an oxidant-free decomposition zone in said thermal conversion zone wherein said hydrogen sulfide is decomposed to hydrogen and sulfur, and mixing the products from said thermal conversion zone and decomposition zone to produce a gas stream feed to said catalytic conversion zone. This gas feed to the catalytic conversion zone provides sufficient hydrogen that no supplemental source of hydrogen is necessary in the tail gas treatment zone.

During the passage of the hydrogen sulfide through the secondary reaction zone, the acid gas is heated to about the furnace flame temperature which is at least 1850° F. and usually over 2000° F. As mentioned previously, Reaction III $$H_2S \rightleftharpoons H_2 + S \tag{III}$$

proceeds at temperatures over about 1000° F., the amount of decomposition increasing rapidly with temperature as shown in the following table of equilibrium conversion.

| Temperature °F. | Equilibrium Conversion |
| --- | --- |
| 1160 | 1.9 |
| 1340 | 3.4 |
| 1700 | 13.1 |
| 2060 | 25.6 |
| 2420 | 37.7 |
| 2780 | 47.0 |

At a suitable operation of the Claus thermal furnace, 2060° F., it will be seen that about 25% of the $H_2S$ passing through the ceramic tube decomposition zone is converted to hydrogen and sulfur. The reverse reaction is avoided because the effluent gases are cooled downstream of the thermal furnace in apparatus such as a waste heat boiler and condenser. Since there is no oxygen left to react at the time the gases are mixed, the hydrogen is not oxidized to water as occurs in the combustion zone.

This system results in a number of advantages. A primary advantage is the elimination of the gas generator for the production of a reducing gas in the tail gas clean-up system. Another advantage is that the amount of air feed to the furnace can be reduced which reduces equipment sizes. The overall plant recovery will be increased by a small increment, because the reaction gas will not be diluted by as large a volume of nitrogen as would normally be the case.

Of course, the thermal decomposition of hydrogen sulfide is endothermic. Therefore, there is a maximum fraction of the inlet hydrogen sulfide that can be cracked before the thermal reactor temperature drops below a safe operating range at which a stable combustion is maintained. This exact fraction will depend upon the acid gas composition, for example.

It is recognized that some hydrogen sulfide is decomposed to hydrogen and sulfur in the typical Claus plant thermal reactor; normally, the maximum decomposition is 6 percent or less of the inlet hydrogen sulfide. The amount of hydrogen sulfide or acid gas passed through the ceramic tube will depend on the amount needed in the tail gas clean-up process. The following table shows some typical percentages.

| Percent of Acid Gas Flow Through Ceramic Tube | Percent of Hydrogen Sulfide Converted to Hydrogen and Sulfur in Muffle Furnace | Percent of Hydrogen in Typical Claus Plant Tail Gas |
| --- | --- | --- |
| 0 | 6 | 2.75 |
| 5 | 6.95 | 3.19 |
| 10 | 7.9 | 3.62 |
| 20 | 9.8 | 4.50 |

The above figures are based upon the assumption that the acid gas can be heated to 2060° F. during its passage through the tube in the muffle furnace. Higher conversions will occur at higher temperatures, of course. Thus, if an amount of hydrogen needed in the tail gas clean-up system is in the neighborhood of 3.6 percent, one would pass 10 percent of the original feed through the ceramic tube.

BRIEF DESCRIPTION OF THE DRAWING

Forming a part of this disclosure is a drawing comprising.

Figure 1:
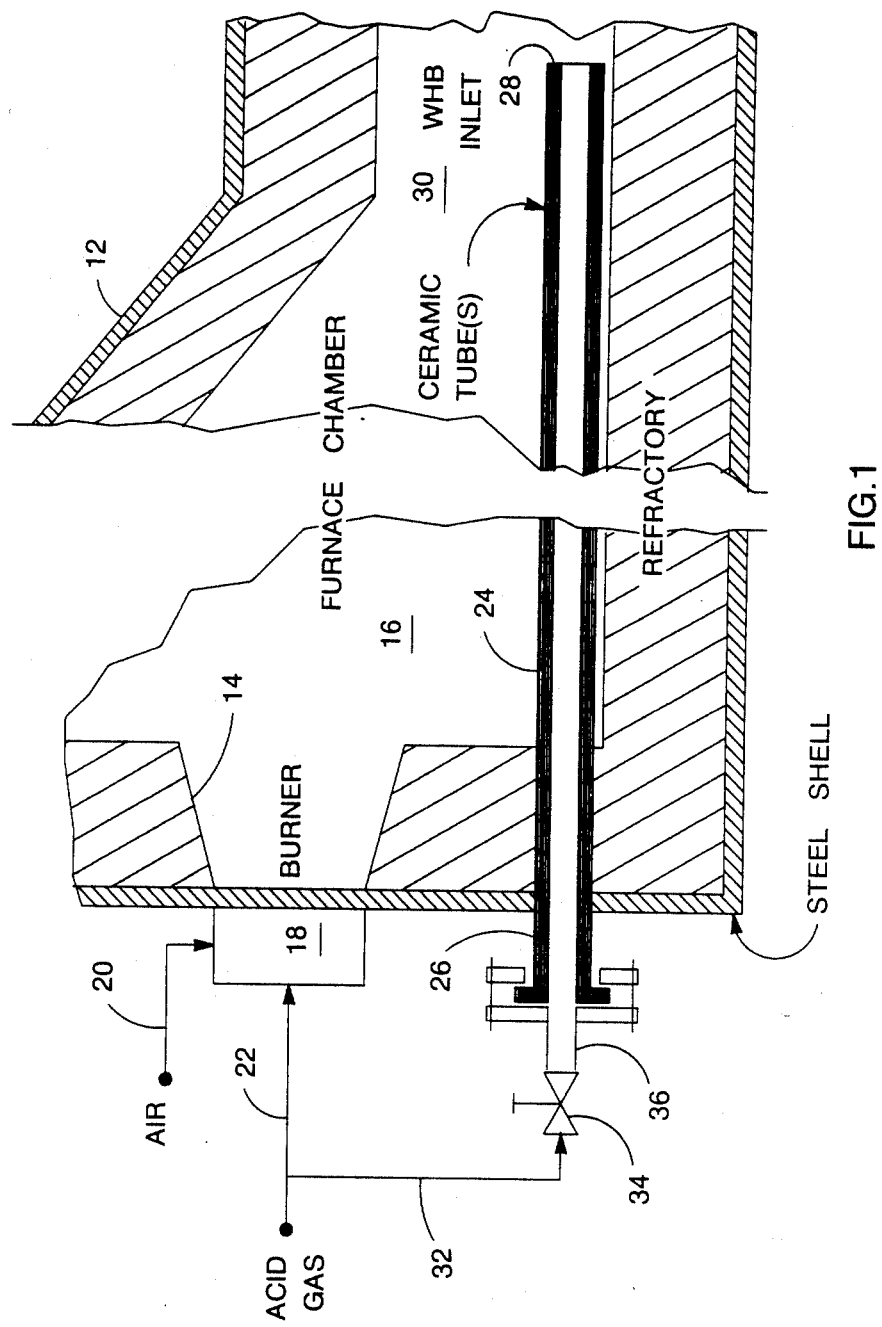
FIG. 1, a cross section drawing of the furnace of this invention.

Common reference numerals are used throughout the drawing.

DETAILED DESCRIPTION OF THE INVENTION

Directing attention to the drawing, a specific embodiment of the invention will be seen. It will be understood that various modifications can be made in the specific details shown and these will be apparent to one skilled in the art.

In FIG. 1, a conventional Claus furnace is shown except for the modification to be subsequently identified.

A furnace comprises a steel shell 12 with a refractory lining 14. At the initial end of furnace chamber 16, burner 18 is provided. The oxidant gas is supplied to the inlet of burner 18 by conduit 20. For convenience, air is shown as the oxidant gas. Acid gas containing hydrogen sulfide is supplied to the second inlet to burner 18 by conduit 22.

The novel feature of the present invention involves the addition of one or more ceramic tubes 24 in some position which will provide heat exchange but not gas exchange with the combustion gases in furnace chamber 16. In this embodiment, these tubes 24 are shown in the lower portion of the furnace chamber 16. These tubes extend from the initial end 26 to a point 28 which is at the far end of furnace chamber 16. A bleed stream conduit 32 extending from conduit 22 supplies hydrogen sulfide to valve 34 and end 36 of tube 24. In one modification, a waste heat boiler (not shown) is provided for recovery of some of the heat of the combustion gases. The inlet to the waste heat boiler is indicated as 30.

Figure 2:
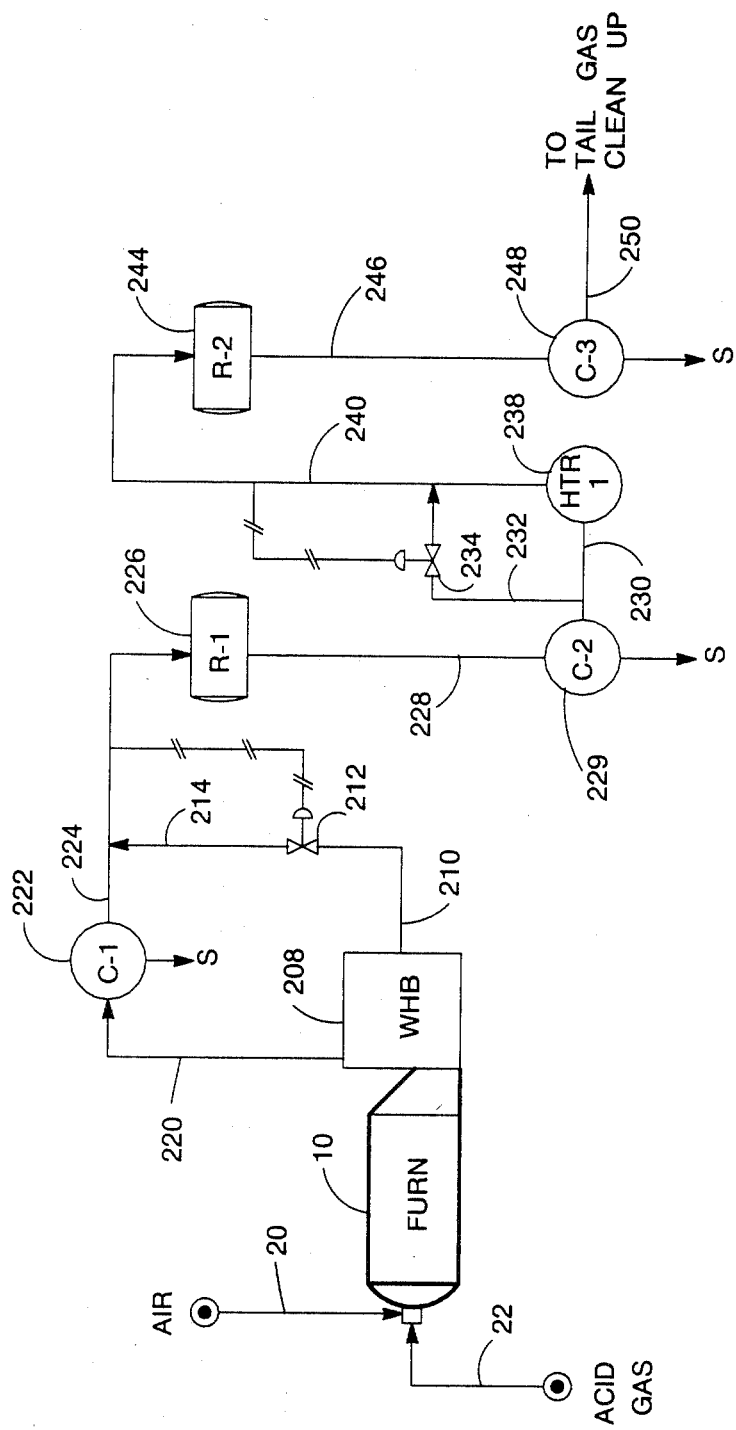
FIG. 2, a schematic representation of the overall Claus process.

FIG. 2 illustrates schematically a two catalytic reactor section Claus plant. Acid gas can be introduced into Claus furnace 10 by line 22; an oxygen containing gas, for example, air can be introduced by line 20. A regeneration effluent stream containing sulfur dioxide and/or elemental sulfur can be introduced from a tail gas clean-up zone by a separate line (not shown). In furnace 10, the acid gas, air, and sulfur dioxide are combusted at a temperature above about 1000° F., preferably about 2000° F. to achieve a stable flame, and a hot product effluent stream comprising elemental sulfur, sulfur dioxide, and unreacted hydrogen sulfide is produced. Preferably, sufficient air is used to produce a 2:1 molar ratio of hydrogen sulfide:sulfur dioxide in the hot reaction product effluent stream. The hot product effluent stream can flow to a waste heat boiler 208, shown in flow communication with furnace 10, for cooling. The cooled effluent product stream can be withdrawn from waste heat boiler 208 by line 220, introduced into first condenser 222 and cooled, for example, to below about 400° F. to condense elemental sulfur which is removed. A portion of the cooled effluent products can also be removed from waste heat boiler 208 by line 210, valve 212 and line 214 and used for reheating the first condenser 222 effluent in line 224 prior to entry into Claus catalytic conversion zone. Other methods of reheat can, of course, also be used.

The Claus catalytic conversion zone illustrated in FIG. 2 uses two Claus catalytic reactors 226 and 244. Each of the catalytic reactors is provided with catalyst, for example, in a supported bed through which the process stream flows and by which the Claus reaction is facilitated. Any of the known Claus catalysts, such as bauxite and alumina, can be used. Each of the reactors 226 and 244 are operated above the sulfur condensation temperature at a bed temperature in the range of about 350° F. to about 700° F., preferably about 350° F. to about 550° F.

Thus, an inlet stream is provided by line 224 at about 450° F. to first Claus reactor 226. In first Claus reactor 226, hydrogen sulfide and sulfur dioxide react in the presence of the Claus catalyst and produce a first reactor effluent stream, which can be removed by line 228, containing elemental sulfur, hydrogen sulfide, and sulfur dioxide.

The first reactor effluent can be introduced by line 228 into second condenser 229 in which the gas can be cooled, for example, to below about 320° F. and elemental sulfur removed. The condenser effluent stream can be removed by line 230, and heated by first heater 238 or bypassed around heater 238 by line 232, valve 234, to produce in line 240 a heated condenser effluent stream at a suitable temperature for Claus reaction, for example, about 400° F.

The stream in line 240 can be passed through second Claus reactor 244 where the Claus reaction is facilitated and an effluent stream containing elemental sulfur, hydrogen sulfide, and sulfur dioxide can be removed by line 246.

The effluent stream in line 246 can be introduced into third condenser 248, cooled to below the sulfur condensation temperature and elemental sulfur removed to produce a third condenser effluent stream which can be removed by line 250. This stream is passed to a tail gas clean-up system, one example of which is shown in FIG. 3.

Figure 3:
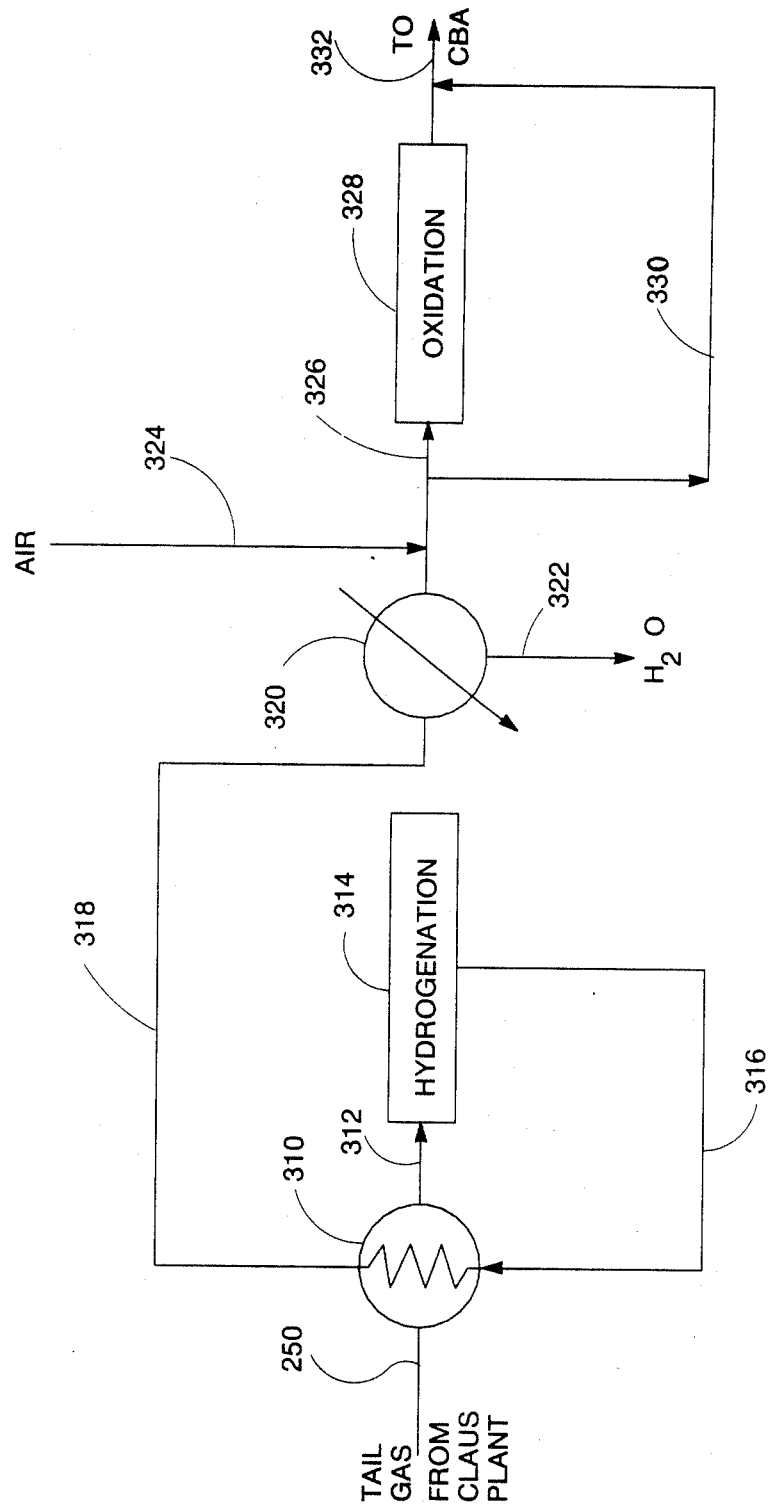
FIG. 3, a schematic drawing of a tail gas clean-up section.

Now considering FIG. 3, one system of tail gas treatment employing a hydrogenation step is schematically shown. Tail gas from the Claus plant (conduit 250) is passed through a preheating heat exchanger 310 for indirect heat exchange with hydrogenation products to be described. The preheated tail gas is fed by line 312 to hydrogenation zone 314.

Hydrogenation can be carried out at temperatures of 450° F. to 1200° F. or even higher, preferably from about 580° F. to about 650° F. Catalytic hydrogenation by contacting with a bed, either supported or fluidized, of effective hydrogenation catalyst is preferred to accelerate hydrogenation of sulfur dioxide and other sulfur containing compounds. Useful catalysts are those which contain metals of groups VB, VIB, VIII and the Rare Earth series of the Periodic Tables defined by Mendeleff, published as the "Periodic Table of the Elements" and Perry and Chilton, *Chemical Engineers Handbook*, 5th Ed. Supports such as silica, alumina, or silica-alumina base are preferred. Preferred catalysts are those containing one or more of the metals, cobalt, molybdenum, iron, chromium, vanadium, thorium, nickel, tungsten, and uranium added as an oxide or sulfide of the metal, although the sulfide form appears to be the active form. Particularly preferred are cobalt-molybdenum hydrogenation catalysts. In the hydrogenation zone, the sulfur dioxide is converted to hydrogen sulfide. In view of the water present, carbonyl sulfide is converted to carbon dioxide and hydrogen sulfide and carbon disulfide is converted to carbon dioxide and hydrogen sulfide. The hydrogenation products are removed by conduit 316 extending to the heat exchanger 310 and thereafter passed through conduit 318 to condenser 320 wherein water is condensed and removed through line 322. Air or other oxidant is added through conduit 324 and one-third of the mixture passed by conduit 326 to oxidation zone 328. Two-thirds of the stream after water removal bypasses the oxidation chamber by conduit 330 to conduit 332. The oxidation zone effluent and bypassed material are combined in conduit 332 and passed to a fluid clean-up zone such as cold bed adsorption zone. Such cold bed adsorption systems are well known in the art and need not be further described here. For instance, attention is directed to Hunt, Jr., et al., U.S. Pat. No. 3,702,884 (1972), to Montgomery, U.S. Pat. No. 3,749,762 (1973), to Goddin, Jr., et al., U.S. Pat. No. 3,758,676 (1973), Kunkel, et al., U.S. Pat. No. 4,035,474 (1977), and Reed, U.S. Pat. No. 4,462,977 (1984). These patents are incorporated by reference.

While a specific embodiment has been described herein, it will be recognized that considerable variation can be made in the broad scope of the invention and such modification will be apparent to one skilled in the art upon reading this disclosure.

I claim:

1. A Claus thermal conversion furnace comprising a primary furnace chamber, a burner in said primary furnace chamber, an oxidant containing gas supply inlet connected to said burner, a hydrogen sulfide containing gas supply conduit connected to said burner, an outlet extending from said furnace, a secondary reaction chamber in heat but not gas exchange relationship with said primary furnace chamber, said secondary reaction chamber extending through the length of said primary furnace chamber to a point in the outlet extending from said furnace, a hydrogen sulfide decomposing catalyst in said secondary reacton chamber, a hydrogen sulfide containing gas supply conduit connected to said secondary reaction chamber.

2. The furnace of claim 1 wherein said catalyst is cobalt-molybdenum.

3. Apparatus for the treatment of a gas stream containing hydrogen sulfide comprising:
(a) a Claus thermal conversion furnace comprising a primary furnace chamber, a burner in said primary furnace chamber, an oxidant containing gas supply inlet connected to said burner, a hydrogen sulfide containing gas supply inlet connected to said burner, an outlet extending from said furnace, a secondary reaction chamber containing a hydrogen sulfide decomposing catalyst in heat but not gas exchange relationship with said primary furnace chamber, said secondary reaction chamber extending through the length of said primary furnace chamber to a point in the outlet extending from said furnace, a hydrogen sulfide containing gas supply inlet connected to said secondary reaction chamber;
(b) a means for sulfur recovery comprising at least one catalytic reactor and at least one sulfur condenser;

(c) a conduit connecting said outlet of said thermal conversion furnace and said means for sulfur recovery;

(d) a tail gas clean-up system comrising a hydrogenation reactor for the conversion of sulfur species to hydrogen sulfide;

(e) a conduit connecting the output of said means for sulfur recovery and said tail gas clean-up system;

(f) means to recover sulfur and hydrogen sulfide from the output from said tail gas clean-up system; and (g) a conduit extending from said tail gas clean-up system and said means to recover sulfur and hydrogen sulfide from the output from said tail gas clean-up system.

4. The apparatus of claim 3 wherein said secondary reaction chamber contains a catalyst.

5. The apparatus of claim 4 wherein said catalyst is cobalt-molybdenum.

* * * * *